United States Patent Office 3,434,977
Patented Mar. 25, 1969

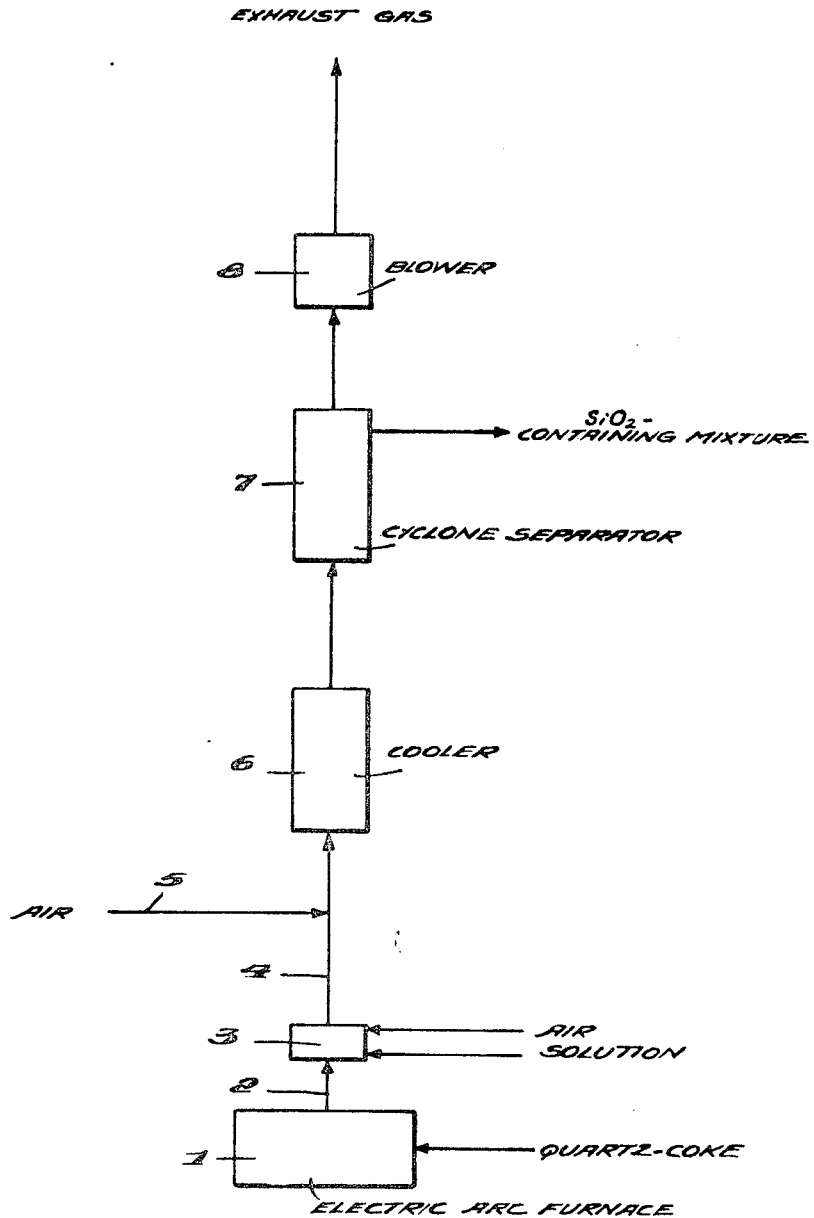

3,434,977
PROCESS FOR THE PRODUCTION OF EXTREMELY FINELY DIVIDED INORGANIC MIXTURES, PARTICULARLY THOSE CONTAINING SILICON DIOXIDE
Walter Neugebauer, Constance, Bodensee, Germany, assignor to Deutsche Gold- und Silber-Scheideanstalt vormals Roessler, Frankfurt am Main, Germany
Filed July 16, 1965, Ser. No. 472,505
Claims priority, application Germany, July 18, 1964, D 44,974
Int. Cl. B01j 11/40
U.S. Cl. 252—454         8 Claims

ABSTRACT OF THE DISCLOSURE

Method for the production of intimate mixtures containing extremely finely divided silicon dioxide, at least one other extremely finely divided inorganic substance having a primary particle size between about 2 and 1000 m$\mu$, preferably, between 5 and 300 m$\mu$, and a BET surface area between about 10 and 300 m.$^2$/g., preferably, between 50 and 250 m.$^2$/g., wherein a hot gas stream of volatilized oxidic silicon produced by reduction of silicon dioxide in an arc furnace is contacted at a temperature above 1000° C., preferably, above 1400° C., with a solution, preferably, aqueous, of a compound forming the other inorganic substance in said mixture to form said intimate finely divided mixture of silicon dioxide and the other inorganic substance.

---

The present invention relates to a novel process for the production of intimate mixtures of extremely finely divided silicon dioxide or other metal oxides with other extremely finely divided inorganic substances. The term "extremely finely divided" is used herein to designate materials whose primary particle size preponderantly is below 1$\mu$ and preferably below 0.5 micron. The specific surface area of the substances therefore correspondingly is between several m.$^2$/g. and several hundred m.$^2$/g. for example, between 10 and 300 m.$^2$/g. The intimate mixtures concerned are extremely far reaching mixtures of the silicon dioxide and the other component of the mixture in the primary particle size region. A number of substances come into consideration as the other components of the mixtures, such as, for example, elements, oxides, mixed oxides, or salt like compounds. The products of the process according to the invention are useful as fillers, pigments for ceramics and especially as catalysts.

Silicon, dioxide in extremely finely divided form, alone, as such, or in intimate mixture with other extremely finely divided oxides have many fields of use in chemical technology, for example, as reinforcing fillers in rubber and synthetic resins, in paints and lacquers, in ceramic colors, in adhesives and as catalysts or as carriers.

One method for the production of extremely finely divided silica or its mixtures with other oxides, which has been known for some time, is the precipitation of silica or of silica in combination with other oxides or hydroxdes, especially aluminum hydroxide from alkali metal silicate solutions with acids such as, for example, carbonic acid or sulfuric acid. The gel thus obtained is filtered off, washed and dried and, if necessary, ground and has a surface area between about 10 and several 100 m.$^2$/g.

Another known method for the production of extremely finely divided silicon dioxide or its mixtures with other oxides starts from a volatile silicon halide or from mixtures of such a silicon halide with another volatile halide which are pyrogenically hydrolyzed to the oxides in the gas phase with water or water forming substances. It is furthermore known that mixtures of oxidic substances and carbon can be given a reducing treatment in an electric arc furnace in such a manner that a gas mixture of CO, suboxides as vapors of metals or respectively metal oxides is obtained which is then burned, taking care that the combustion is complete and that the temperature is sufficiently low that agglomeration is avoided or at least reduced considerably.

The production of intimate mixtures of extremely finely divided silica with other extremely finely divided oxides according to previously known methods is subject to certain fundamental limitations depending upon the particular methods employed, such as, for example, the substance from which the other component of the mixture is derived must be alkali soluble if the wet precipitation method is used or it must be volatile if the pyrogenic method is used. In the electric arc furnace described a large number of SiO$_2$-oxide mixtures or mixed oxides can be produced insofar as the substance added to the silicon dioxide carbon mixture can be volatilized as an oxide, suboxide or as an element under the temperature and reaction conditions of the electric arc. Examples of such suitable substances, for instance, are: boron, phosphorus, arsenic, antimony, bismuth, tin, lead, zinc, cadmium in elemental form or in the form of their oxides. As a reducing atmosphere is present in the arc furnace, such substances which are reduced therein to high melting elements or carbides are not suitable as they cannot be volatilized or can only be volatilized to a limited extent. This causes a substantial limitation on the substances which may be added to the silicon dioxide mixture.

A further disadvantage of the mixed oxides produced by previously known wet processes is that the end products, as a result of the individual precipitation or hydrolysis velocities of the various components, mostly exhibit greatly varied particle sizes and because of this do not provide a very satisfactory mixture with each other.

The object of the invention is to provide a process which renders it possible to produce intimate mixtures of extremely finely divided silica with one or more other extremely finely divided substances in which all of the compounds have a far reaching uniform particle size.

The characteristic of the process according to the invention resides in that at least one oxidic silicon compound is converted into the gas phase and permitted to act upon the substances forming the other component in the finely divided mixture to be prepared at temperatures above 1000° C., preferably above 1400° C., and the solid finely divided substances formed are separated off upon cooling down. Silicon dioxide or silicon monoxide or mixtures of both oxides can be used as the oxidic silicon compound. The use of silicon monoxide as the oxidic silicon compound is, however, of particular advantage. Expediently such gas phase silicon m onoxide can be produced by reduction of silicon dioxide, for example, quartz, or substances containing a major part of silicon dioxide with carbon, for example, coke, silicon, silicon carbide, aluminum or magnesium with the aid of an electric arc. Coke is preferably used as the reducing agent. The disproportionation product of silicon monoxide to which the formula (SiO$_2$)$_x$.Si$_y$ may be ascribed can also be used for the purposes of the invention, as in the use of silicon monoxide a greater or lesser proportion thereof can already be present at the location of the reaction in the form of this extremely finely divided disproportionation product.

After the oxidic silicon compound has been converted to the gas phase, the substance or substances from which the other component or components in the oxide mixture are derived, hereinafter referred to as added substance or substances, is then supplied, expediently in the form of an aqueous solution to the resulting hot gas stream whereby the added substance is converted into an extremely finely divided highly disperse state and, in the case of the oxidic silicon compound is silicon monoxide or its disproportionation product, it is simultaneously converted into extremely finely divided silicon dioxide. An intimate mixture of all components is also effected simultaneously without requirement of other measures.

The determination of the temporal progress of the conversion of the added substances into an extremely finely divided highly disperse form and of the oxidation of the silicon monoxide to silicon dioxide cannot be ascertained with exactitude in view of the high temperatures and the great reaction velocity at the location of the introduction of the added substances and of the oxidation of the silicon monoxide. It is conceivable that the solutions containing the added substances directly interact with the gaseous silicon monoxide; however, it is also possible that a greater or lesser part of the silicon monoxide can be present at the location of the reaction in the form of extremely finely divided solid silicon monoxide or respectively its disproportionation product as a result of condensation. It also is conceivable that the oxidation of the silicon monoxide (in the gas phase or partially or completely in the extremely finely divided solid phase) is effected by the water of the aqueous solution of the added substances supplied or the oxygen contained in the air employed to atomize such solutions or by separately supplied air or by a combination of all of such oxygen containing agents. In this connection the essential characteristic for the process according to the invention in every instance is the primary conversion of at least one oxidic silicon compound into the gaseous phase.

The added substances can be supplied to the process in the form of solutions of suited compounds. It is an especial advantage of the process according to the invention that the possibilities of selection with regard to the type and number of other components in the resulting oxide mixture are very great. Expediently aqueous solutions of compounds are employed which upon interaction with the silicon oxide at the high temperatures indicated which has been converted into the gas phase will produce the desired other components of the oxide mixture produced. For example, nitrates, acetates, halides and other thermally decomposable salts of metals, such as, magnesium nitrate, silver nitrate, copper acetate, bismuth citrate, nickel chloride, as well as thermally decomposable salts of anion formers, such as, ammonium dichromate, ammonium molybdate, ammonium phosphate, as well as pure acids and bases, such as boric and phosphoric acids or NaOH and furthermore complex compounds, such as ammonium complexes, complex compounds of heavy metals with tartaric acid or citric acid or ethylene diamine tetraacetic acid come into consideration as such added substances. The process according to the invention, however, is not limited to the use of aqueous solutions of the added substances as solutions in organic solvents such as alcohols can also be used when it appears expedient. Expediently the solutions of the added substances are supplied to the hot volatilized silicon oxide in finely divided form such as by spraying or atomizing such solutions into such hot volatized silicon oxide.

An especially noteworthy advantage of the present invention is the possibility of producing extremely finely divided silicon dioxide containing mixtures containing a plurality of other components. For this purpose it is only necessary to introduce a plurality of added substances into the oxidic silicon compound which has been converted to the gas phase, expediently in the form of a solution containing all of the desired added substances. For example, an intimate mixture of extremely finely divided silicon dioxide with extremely finely divided oxides of molybdenum and iron is obtained when an aqueous solution of ammonium molybdate, ferriammonium citrate and ammonium hydroxide is employed.

Extremely finely divided oxide mixtures produced according to the invention can, for example, be used in petro chemical oxidations. In recent times increasing use has been made in petro chemistry of catalyst which contain mutually active substances on a carrier. In order to obtain good catalytic activity it is necessary that the various active substances are brought into intimate contact with each other as well as to attain a high dispersion. In the previously most usually used wet process for the production of such catalysts, for example, by precipitation or impregnation, both of such requirements often were not satisfactorily met because of the different precipitation and decomposition velocities encountered.

The process according to the invention on the other hand fulfills these requirements in a very excellent manner. In contrast to the known wet methods of producing catalysts, which require a number of process steps before the finished catalyst is obtained, the process according to the invention can deliver the finished dry catalyst in a single process step.

The extremely finely divided inorganic silicon dioxide mixtures produced according to the invention can be used directly as catalysts for catalytic processes, especially for those using the fluidized bed technique. It, however, is also possible to transform such products into any desired shape, such as tablets, granulates and the like, for example, by pressing, extrusion or any other known shaping procedure. Surprisingly it was found that the mixtures according to the invention in many instances could be converted into extraordinarily strong shaped bodies without the addition of binding agents.

The supply of the solutions containing the added substances to the oxidic silicon compound which has been converted to the vapor phase advantageously is effected by one or more liquid pressure nozzles or two material nozzles operated with compressed air. The water which is introduced by the solutions is evaporated by the heat contained in the hot gas stream and in the event silicon monoxide is used also by the heat of reaction liberated during its oxidation. Usual measures are taken so that the temperature in the apparatus is maintained above the dew point of the water vapor and solids containing gas mixture so as to avoid corrosion and formation of incrustations.

The separation of the intimate mixture of the silica and the other components does not provide any special difficulties despite the fineness of the primary particles and can be achieved with known means, such as, for example, a cyclone separator or a group of such separators. It was surprisingly found that the primary particles always associate into light flock-like aggregates with dimensions of the order of several microns, which facilitates their separation from the gas stream. Photomicrographs taken with the electric microscope show that absolutely no mechanical bonds exist between the primary particles. It can be assumed that the cohesion is effected by weak electric forces. However, it is also possible to direct the process in such a manner that stronger secondary particles are obtained in which the primary particles are held together by sintering and/or chemical reaction such as silicate formations. For this purpose, either a higher temperature and/or a longer period of stay at the location of the reaction must be provided for. This can be effected by reducing the quantity of air supplied for the cooling as well as by selecting a conduit cross-section appropriate for the desired period of stay.

The other components in the silicon dioxide containing mixtures can be present therein in various chemical states, for example, in elemental, oxidic or salt like form. Examples thereof are: nickel, silver, magnesium oxide, chromium oxide, sodium phosphate. They always are present in an extremely finely divided state which can be ascertained by electron microscopic viewing of the mixtures or the pure additional substances isolated chemically from such mixtures. At an enlargement of 50,000× electron microscopic photographs, the primary particles of the silicon dioxide in most instances cannot be differentiated from those of the other components.

per hour. Directly downstream from the location where the silver nitrate solution was introduced, the aerosol produced was cooled down to 280–300° C. by the introduction of 320 Nm.³ of air at room temperature. 7 kg. per hour of a yellow brown extremely finely divided mixture of silica and silver were recovered from the separator. The silver content of the product was 32.5% by weight. The specific surface area of such product was 60 m.²/g. X-ray diffraction analysis indicated that in addition to the amorphous portion it exhibited the interferences of metallic silver as well as those of silver nitrite in a very slight quantity. When the product was heated for 2 hours at 400° C. the silver nitrite content was converted to silver.

Example 4

A light grey colored product was produced in a manner analogous to that of Example 1 using an aqueous copper acetate solution instead of the nickel nitrate solution. Such product was an intimate mixture of copper oxide and silica with a specific surface area of 65 m.²/g. and a 2.1% by weight copper content. The X-ray diagram surprisingly exhibited the interferences of Cu I oxide rather than the expected Cu II oxide.

Example 5

An aqueous solution containing 54 g. $(NH_4)_2Cr_2O_7$ per liter was introduced into a hot gas stream containing silicon monoxide and carbon monoxide as in Example 1 at a rate of 12 liters per hour. 5.6 kg. per hour of a greenish grey colored intimatae mixture of chromium oxide and silica were produced. The specific surface area of such mixture was 66 m.²/g. and it contained 6.7% of $Cr_2O_3$. In order to ascertain the fineness of the chromium oxide a sample of the mixture was extracted with aqueous NaOKOH in order to remove the silica. The pure chromium oxide recovered after washing, centrifuging and drying had a specific surface area of 85 m.²/g. Another sample of the mixture was extracted with hydrofluoric acid. The pure chromium oxide obtained in this manner had a specific surface area of 88 m.²/g.

Example 6

An aqueous solution of iron-III nitrate (acidified with $HNO_3$) containing 105 g. of iron per kg. of solution were introduced at a rate of 15 kg. per hour into a hot silicon monoxide and carbon monoxide containing gas stream produced as in Example 1. 7.1 kg. per hour of a greyish violet finely divided mixture of $Fe_3O_4$ and $SiO_2$ were produced. The $Fe_3O_4$ content thereof was 28.5% and its specific surface area was 44 m.²/g. An electron microphotograph of the mixture revealed that the mixture was composed of round primary particles of a particle size between 5 and 200 m$\mu$. A sample of such mixture was tempered for 5 hours in air at 700° C. Thereafter the mixture had a specific surface area of 33 m.²/g. and the X-ray diagram revealed the line of $\alpha$ $Fe_2O_3$ in addition to an amorphous portion.

Example 7

A finely divided intimate mixture of 97% of $SiO_2$ and 3% of $Al_2O_3$ with a specific surface area of 90 m.²/g. was obtained by introducing an aqueous solution of aluminum formate into a hot gas stream containing silicon monoxide and carbon monoxide produced as in Example 1.

Example 8

A finely divided intimate mixture of 92.6% of $SiO_2$ and 7.4% of MgO with a specific surface area of 101 m.²/g. was obtained by introducing 10 liters per hour of an aqueous solution of magnesium acetate containing 24 g. of magnesium acetate per liter into a hot gas stream containing silicon monoxide and carbon monoxide produced as in Example 1.

Example 9

A hot gas stream containing 7.7 kg. per hour of silicon monoxide was produced in an electric arc furnace from a continuously supplied mixture of ground quartzite and silicon in a ratio of 2.14:1 by weight. An aqueous solution of 180 g. zinc nitrate per liter of water was introduced under a pressure of 8 atmospheres gauge pressure into such hot gas stream at a rate of 15 liters per hour with the aid of a water cooled nozzle ring provided with six concentrically arranged pressure nozzles. 45 Nm.³ per hour of air were blown concentrically into the gas stream downstream (above) the pressure nozzles through a ring nozzle provided with 40 outlet holes 1 mm. in diameter. 11 kg. per hour of an intimate mixture of silica and zinc oxide were recovered in the cyclone separators. The specific surface area of the product was 113 m.²/g. and the zinc oxide content was 10.1%.

Example 10

9 liters per hour of an aqueous solution containing 10 g. per liter of $H_3PO_4$ where introduced into a hot gas stream containing silicon monoxide and carbon monoxide produced as in Example 1. A finely divided white silica with a specific surface area of 152 m.²/g. and a phosphorus content of 0.51% was recovered in the cyclone separator. The pH value of a sample thereof suspended in water was 2.9.

(a) Analogously using an aqueous solution containing 15 g. of $NaH_2PO_4$ per liter, a finely divided white silica with a specific surface area of 142 m.²/g. and a phosphorus content of 0.65% and a sodium content of 0.48% was obtained. The pH value of a sample thereof suspended in water was 5.4.

(b) Analogously using an aqueous solution containing 15 g. $Na_2HPO_4$ per liter, a finely divided white silica with a specific surface area of 167 m.²/g. and a phosphorus content of 0.46% and a sodium content of 0.68% was obtained. The pH thereof in aqueous suspension was 7.5.

(c) Analogously using an aqueous solution containing 14.5 g./l. of $Na_2CO_3$, a finely divided white silica with a specific surface area of 161 m.²/g. and a sodium content of 1.03% was obtained. The pH value thereof in aqueous suspension was 9.8.

Example 11

A hot gaseous stream of a mixture of silicon monoxide, zinc oxide, zinc and carbon monoxide was produced in an electric arc furnace from a continuously supplied mixture of 5.5 kg. of quartz sand, 1.2 kg. of zinc oxide and 1.1 kg. of petroleum coke per hour. 13 liters per hour of an aqueous ammonium dichromate solution with a chromium content of 72 g./l. were introduced into the hot gas stream leaving the furnace through 4 concentrically arranged liquid pressure nozzles. 7.6 kg. per hour of a finely divided mixture of silica, zinc oxide and chromium oxide were obtained in the separators. The greenish grey product had a specific surface area of 55 m.²/g., a primary particle size between 5 and 250 m$\mu$, a ZnO content of 13.8% and a $Cr_2O_3$ content of 19.8%. The X-ray diagram of the product in addition to showing an amorphous part contained the lines of $ZnCr_2O_4$ and $Cr_2O_3$.

Example 12

Operating analogously to Example 1 a finely divided greyish violet product with a specific surface area was obtained by introducing an aqueous ammonium molybdate solution instead of the nickel nitrate solution. X-ray diffraction investigation gave the unexpected indication that the molybdenum was present in the product as molybdenum dioxide ($MoO_2$), which could be explained by the reducing action of the silicon monoxide. The $MoO_2$ content was 7.1%. The $MoO_2$ content was isolated by dissolving out the $SiO_2$ with aqueous KOH and after careful washing it was examined as an aqueous suspension with an electron microscope. It was found that the $MoO_2$ was extremely finely divided and had a particle size between about 4 and 10 m$\mu$.

The particle dimensions lie between about 2 and 1000 mμ, preeminently between about 5 and 300 mμ. A further indication of the extremely finely divided nature of the mixtures according to the invention, as well as of the other components is obtained by measurement of the specific surface area thereof by nitrogen adsorption according to Braunnauer, Emmett and Teller (BET method). The mixtures exhibit specific surface areas between about 50 and 250 m.$^2$/g. When the silicon dioxide is dissolved out of such mixtures with aqueous NaOH or with hydro-fluoric acid the remaining other components exhibit specific surface areas of the same order.

It is possible and, in instances, can be advantageous to give the mixtures as well as the other components a further treatment. Such further treatment, for example, can be with hydrogen to effect reduction of one or the other components which is present as one oxide to the metal, such as, for example, the reduction of nickel oxide to nickel. As the oxides are present in extremely finely divided form, the reduction can be effected under very moderate and protective conditions at low temperatures. The metal produced in this manner is also in extremely finely divided form and in intimate mixture with the silicon dioxide.

The extremely finely divided other components can be recovered from the silica containing mixtures in pure form by treatment of such mixtures with $SiO_2$ dissolving agents such as alkalies or hydrofluoric acid. The recovery can be effected from the original mixture or from such a mixture after it has been subjected to a further treatment. It is, for example, possible in this manner, for example, by treatment of the silica containing mixtures with aqueous NaOH and adequate washing, to obtain extremely finely divided pure nickel oxide with a specific surface area between 100 and 250 m.$^2$/g. and extremely finely divided nickel with a specific surface area of, for example, 252 m.$^2$/g.

Other after treatments can also be carried out, such as, for example, to convert the other component into another extremely finely divided chemical compound, for instance, into the corresponding sulfide by treatment with $H_2S$ or sulfur vapors. It is also possible to convert the intimate mixtures of silicon dioxide with oxidic components into the corresponding silicate by appropriate heat treatment.

The present invention is primarily described with reference to the production of silicon dioxide containing mixtures which have an especially broad application in chemical technology. It, however, is not limited to such mixtures and can, in principle, also be employed for the production of mixtures of extremely finely divided inorganic substances with the aid of other oxidic material which can be converted to the gas phase before being contacted with the added substance forming the other component of the mixtures. Aluminum oxide which is capable of forming a gaseous suboxide, for example, the silicon dioxide contained in the mixtures produced according to the invention. In addition, mixtures of oxidic volatilizable compounds, such as, of silicon dioxide and zinc oxide can be converted into the gas phase and permitted to interact with the compounds forming the other component of the mixtures obtained.

The accompanying drawing shows a simplified schematic flow sheet of the process according to the invention.

With reference to such drawing:

A mixture of quartz and coke in a ratio of 5:1 by weight is continuously supplied to an electric arc furnace 1 to produce a gas stream 2 of silicon monoxide and carbon monoxide which leaves the furnace at about 2000° C. and into which an aqueous solution containing the compound, such as, for example, nickel nitrate which is to produce the other component of the silicon dioxide containing mixture to be produced is introduced in chamber 3 through concentrically arranged nozzles with the aid of compressed air. This causes a conversion of the metal salt solution into extremely finely divided metal oxide and metal and an oxidation of the silicon monoxide to extremely finely divided silicon dioxide as well as an extremely intensive mixture of all solid components produced at the location of the reaction. The resulting hot gas 4 which contains the solid reaction products in the form of an aerosol is diluted with an air stream 5 in order that it be cooled, for example, to about 250° C. and then further cooled in a tube water cooler 6. The resulting intimaate finely divided silicon dioxide containing mixture of solids is separated off in separator 7, for example, consisting of one or more cyclone separators while the gas stream which has been freed of the solid components contained therein is exhausted with the aid of blower 8.

The following examples will serve to illustrate the process according to the invention with reference to several embodiments thereof.

Example 1

A mixture of gaseous silicon monoxide and carbon monoxide was formed in an electric arc furnace continuously supplied with a 5:1 by weight mixture of quartz sand and coke. The gas stream which left the furnace at about 2000° C. contained 4.0 kg. of SiO per hour and 2.5 kg. of CO per hour. 15 liters per hour of a 10% aqueous nickel nitrate solution was introduced into the hot gas stream through a water cooled nozzle ring from 4 two substance nozzles operated with compressed air and reacted therewith. The aerosol which resulted was cooled down to 250° C. downstream from the nozzle ring by the addition of air and subsequently cooled to 70° C. in a water cooler. 5.8 kg. per hour of grey colored intimate mixture of silicon dioxide, nickel oxide and nickel were then collected from the gas stream in an aggregate of 3 cyclone separators.

The nickel content of the product amounted to 11.7% by weight. The specific surface area of the product was 95 m.$^2$/g. The X-ray diagram in addition to containing a diffuse ring for $SiO_2$ also exhibited the interferences of nickel oxide and metallic nickel. Photographs taken with an electron microscope with an enlargement 50,000× revealed spherical particles with dimensions between about 5 and 300 mμ, but no differentiation could be made between silica, nickel oxide and metallic nickel.

After the silica content had been dissolved out with aqueous NaOH and the residue had been washed several times with water and dried, the dried product had a specific surface area of 187 m.$^2$/g. This extraordinarily high surface area indicates the extreme fineness of the particle size of the nickel oxide and nickel component of silicon dioxide containing mixture produced.

Example 2

An intimate finely divided mixture containing silicon dioxide and nickel oxide obtained under conditions described in Example 1, except that a nickel acetate solution replaced the nickel nitrate solution, was given a reduction treatment at 300° C. under a stream of hydrogen and then cooled (taking the usual precautionary measures for active nickel powder) and after cooling contacted with the atmosphere. X-ray diffraction analysis indicated that in addition to silica, metallic nickel was the main component whereas only small quantities of nickel oxide were present.

In order to ascertain the fineness of the finely divided nickel the silica was dissolved out of the product with aqueous NaOH. The remaining nickel had a specific surface area of 252 m.$^2$/g.

Example 3

12 liters per hour of an aqueous silver nitrate solution containing 320 g./l. of $AgNO_3$ were introduced with the aid of 25 Nm.$^3$ of compressed air (3.5 atmospheres gauge pressure) into a hot gas stream produced as in Example 1 containing 4.0 kg. of silicon monoxide and 2.5 kg. of CO

Example 13

12 l. per hour of an aqueous solution of ammonium hepta molybdate, ferriammonium citrate and ammonium hydroxide containing 43.5 g. of Mo, 12.2 g. of Fe and 30 g. of NH$_4$OH per liter were introduced into a hot gas stream containing silicon monoxide and carbon monoxide produced as in Example 1. 6.1 kg. per hour of a greyish green finely divided mixture of silica with molybdenum and iron oxides with a specific surface area of 70 m.$^2$/g. and a 9.2% of Mo and 2.6% Fe content were obtained. X-ray diffraction investigation in addition to an amorphous portion revealed the strongest lines of molybdenum dioxide and several non-identified lines. Examination with an electron microscope indicated that the primary particles of the mixture were round and had a particle size between 10 and 250 m$\mu$.

Example 14

A mixture of gaseous silicon monoxide and carbon monoxide was formed in an electric arc furnace continuously supplied with a 5:1 by weight mixture of quartz sand and coke. The gas stream which left the furnace at about 2000° C. contains 4.0 kg. of SiO per hour and 2.5 kg. of CO per hour. 15 liters per hour of an aqueous solution containing 69.0 g. of ammonium hepta molybdate, 117.5 g. of bismuth citrate, 60.0 g. of ammonium hydroxide and 4.4 g. of diammonium hydrogen phosphate per liter were introduced into the resulting gas stream. After the reaction mixture had cooled down the finely divided oxide mixture was separated in a cyclone separator. The yield was 6.9 kg. per hour. The light grey colored product had a specific surface area of 106 m.$^2$/g. The X-ray diagram of the product contained a large number of interferences, of which that of molybdenum dioxide and bismuth (small quantities) could be identified. Chemical analysis of such product gave a formal composition by weight of 74.3% of SiO$_2$, 11.4% of MoO$_3$, 13.8% of BiO$_3$ and 0.5% of P$_2$O$_5$.

100 g. of the powdery product was stirred into a thick paste wtih 67 g. of water and shaped into cylindrical bodies 3 mm. long and 2 mm. in diameter at a pressure of 2 kg./cm.$^2$. After drying at 120° C. such bodies were tempered at 540° C. for 16 hours under access of air. The tablets thus obtained exhibited a good strength of 17 kg./cm.$^2$ parallel to the cylinder axis and 8 kg./cm.$^2$ vertical to such axis.

60 g. of the tablets thus produced were placed in a reactor composed of a quartz tube with an inner diameter of 27 mm. and contacted at a temperature of 530° C. with 133 Nl./h. of a gaseous mixture of 7.5 vol. percent of propylene, 48.9 vol. percent of air and 43.6 vol. percent of water. 13.3 g. of acrolein per hour were thus produced which corresponds to an acrolein yield of about 53% with reference to the propylene supplied.

In a description in the literature of a known process in which a silica supported catalyst produced by wet precipitation containing bismuth, molybdenum and phosphorus oxides is used for the oxidation of propylene with air in the presence of water vapor at temperatures between 260–538° C., the acrolein yield (with reference to propylene supplied) was given as 41% as a maximum even though the quantity of bismuth, molybdenum and phosphorus oxides was twice as large as that of the catalyst according to the invention prepared as above.

Example 15

12–13 liters per hour of an aqueous solution of ammonium hepta molybdate, bismuth citrate, ammonium hydroxide and diammonium hydrogen phosphate were introduced into a hot gas stream containing silicon monoxide and carbon monoxide produced as in Example 14. Such solution per liter contained 62.7 g. of molybdenum, 102.0 g. of bismuth, 1.68 g. of phosphorus, about 92 g. of citric acid and about 60 g. of ammonium (calculated as NH$_4^+$). Between 8 and 8.5 kg. per hour of a grey finely divided powder were recovered from the reaction mixture in cyclone separators. Such product had a specific surface area of 50 m.$^2$/g. 500 g. of such product were stirred into a thick paste with 205 g. of water and such paste then dried at 120° C. and the dried product tempered under access of air for 16 hours at 540° C. A lumpy, light greenish yellow colored very hard product resulted. The latter was crushed and sieved to produce a product having a particle size between 0.5 and 2 mm. The specific surface area of the crushed and sieved material of such particle size was 41 m.$^2$/g. and the average micropore diameter was 100 A. Chemical analysis of such product gave a formal composition by weight of 66.0% of SiO$_2$, 15.0% of MoO$_3$, 18.4% of Bi$_2$O$_3$ and 0.6% P$_2$O$_5$.

70 g. of the catalyst thus produced were placed into a reactor formed of an upright chromium nickel steel tube having an inner diameter of 27 mm. The height of the catalyst filling in such tube was 150 mm. A vertically movable microthermocouple was arranged within such catalyst filling. 120 Nl./h. of a gas mixture of 6.9 vol. percent of propylene, 44.9 vol. percent of air and 48.2 vol. percent of water vapor were passed through such catalyst filling while the minimum temperature maintained in its interior was 505° C. and the maximum temperature therein was 540° C. The yield was 11.8 g. of acrolein per hour. This corresponds to an acrolein yield of 57% with reference to the propylene supplied. The propylene conversion was 84%.

I claim:

1. In a process for the production of an intimate mixture of (A) extremely finely divided silicon dioxide and (B) at least one other extremely finely divided inorganic substance, the primary particle size of which is between about 2 and 1000 m$\mu$ and the BET surface area of which is about 10 to 300 m.$^2$/g., said substance B being in elemental, oxidic or salt like form by simultaneous conversion of at least one volatilized oxidic silicon compound and at least one compound forming component B, the improvement which comprises contacting a solution of at least one compound selected from the group consisting of thermally decomposable metal salts, thermally decomposable salts of anion formers, acids and bases which form component B with a hot gas stream at a temperature over 1000° C. containing a vaporized oxidic silicon compound, produced by reduction of silicon dioxide with a reducing agent in an electric arc furnace, after it leaves the arc furnace, cooling down the reaction mixture and collecting the resulting finely divided mixture of solids.

2. The process of claim 1 in which the volatilized compound is at a temperature above 1400° C. when contacted with said solution.

3. The process of claim 2 in which said volatilized compound is silicon monoxide and said solution is an aqueous solution.

4. The process of claim 3 in which the volatilized silicon monoxide is contacted with said solution in the form of a hot gas stream of silicon monoxide and carbon monoxide produced by reduction of silicon dioxide with carbon in an electric arc furnace.

5. The process of claim 3 in which the volatilized compound is contacted with said solution under oxidizing conditions.

6. The process of claim 3 in which the volatilized compound is contacted simultaneously with said solution and air.

7. The process of claim 3 in which another volatilizable inorganic compound is volatilized along with said silicon monoxide and said volatilized mixture is contacted with said solution.

8. The process of claim 3 comprising in addition dissolving out the silicon dioxide from the mixture to leave the extremely finely divided other inorganic component.

References Cited

UNITED STATES PATENTS 3,002,808 10/1961 La Mont.
3,311,451 3/1967 Biegler et al. _____ 23—188

FOREIGN PATENTS 859,271 1/1961 Great Britain.

DANIEL E. WYMAN, *Primary Examiner.*

C. F. DEES, *Assistant Examiner.*

U.S. Cl. X.R.

23—182